United States Patent [19]

Tsuzuki

[11] Patent Number: 4,502,119
[45] Date of Patent: Feb. 26, 1985

[54] ELECTRONIC REGISTER

[75] Inventor: Hanzo Tsuzuki, Tokyo, Japan

[73] Assignee: Casio Computer Co., Ltd., Tokyo, Japan

[21] Appl. No.: 317,593

[22] Filed: Nov. 2, 1981

[30] Foreign Application Priority Data

Nov. 12, 1980 [JP] Japan .................... 55-158141

[51] Int. Cl.³ ...................... G06F 15/02; G06F 15/20
[52] U.S. Cl. ...................................... 364/405; 364/900
[58] Field of Search ............... 364/405, 406, 404, 900, 364/709, 710

[56] References Cited

U.S. PATENT DOCUMENTS

| 4,138,733 | 2/1979 | Tadakuma et al. | 364/405 |
| 4,159,533 | 6/1979 | Sakurai | 364/405 |
| 4,317,172 | 2/1982 | Nakano | 364/405 |
| 4,360,872 | 11/1982 | Suzuki et al. | 364/405 |
| 4,389,707 | 6/1983 | Tsuzuki | 364/405 |

Primary Examiner—Jerry Smith
Assistant Examiner—Michael R. Fleming
Attorney, Agent, or Firm—Frishauf, Holtz, Goodman and Woodward

[57] ABSTRACT

An electronic register of the invention has, at an input unit, at least a first selection key which is operated for performing the normal registering, a second selection key which is operated for performing single item registering for accumulating sales data according to both classification and payment type, and keys for designating the item number codes. A memory has a first memory for storing sales data input by the operation of the keys in memory locations according to the item number codes, and a second memory for storing the sales data according to the payment types. When the first selection key is operated, the normal registering is performed. When the second selection key is operated, the sales data is stored in the first memory and is printed on a receipt sheet in the single item registering mode and the receipt is issued. The sales data is also classified according to the payment types and stored in the second memory.

2 Claims, 5 Drawing Figures

ELECTRONIC REGISTER

BACKGROUND OF THE INVENTION

The present invention relates to an electronic register wherein selection between the normal registering mode and the single item registering mode for executing classification and registering of sales data for single payment according to payment type may be easily made by operation of keys. In general, an electronic register has the single item registering mode for issuing one receipt sheet by inputting an amount paid for one item by an amount key and operating a department key and the normal registering mode for issuing one receipt sheet by sequentially inputting amounts paid for a plurality of items and operating a payment type key.

When it is necessary to increase the number of items corresponding to a department key in the single registering mode, for example, when it is required to increase the number of items as in a restaurant, the number of item number keys must be increased accordingly.

When the electronic register is operated in the single registering mode, a plurality of keys corresponding to the item may only be operated for registering one item. For example, when a single customer purchases a number of items, a plurality of receipts are issued each corresponding to each of the items purchased. For this reason, switch from the single item registering mode to the normal registering mode for registering a plurality of items on a single receipt have been impossible.

SUMMARY OF THE IVENTION

It is an object of the present invention to provide an electronic register which eliminates the drawbacks of the prior art electronic registers and which selection between the normal registering mode and the single item registering mode for accumulating sales data according to both classification and payment type may be easily made by operation of keys.

In order to achieve the above and other objects, there is provided according to the present invention an electronic register comprising inputting means including a first selection key which is operated for executing at least the normal registering, a second selection key which is operated for accumulating sales data according to both classification and payment type, and keys for designating an item number; memory means including a first memory which is connected to said inputting means and which stores the sales data at an address corresponding to the item number and a second memory for storing the sales data for each payment according to payment type; arithmetic means, connected to said inputting means and said memory means, for executing the normal registering to accumulate the sales data for each item number upon operation of said first selection key and for storing the sales data in said first memory and accumulating and storing in said second memory means the sales data for each payment upon operation of said second selection key; and receipt issuing means which is connected to said inputting means, said memory means and said arithmetic means and which includes means for printing the sales data on a receipt sheet and issuing a receipt after operation of the sales data by said arithmetic means is completed upon operation of at least said second selection key.

With the arrangement described above, according to the electronic register of the present invention, the normal registering can be performed upon operation of the first selection key and the single item registering mode can be performed upon operation of the second selection key wherein the sales data for each payment are accumulated according to both classification and payment type. Even if the number of items increases, the item numbers can be increased to numerals of 2 or 3 digits by operation of the ten keys, so that the number of keys need not be increased above the number of the ten keys.

For the sales data for the same items, either the normal registering mode or the single item registering mode can be performed by selectively operating either one of the first selection key and second selection key.

DETAILED DESCRIPTION OF THE PREFERRED EMBODIMENTS

The preferred embodiments of the present invention will now be described with reference to the accompanying drawings.

Figure 1:
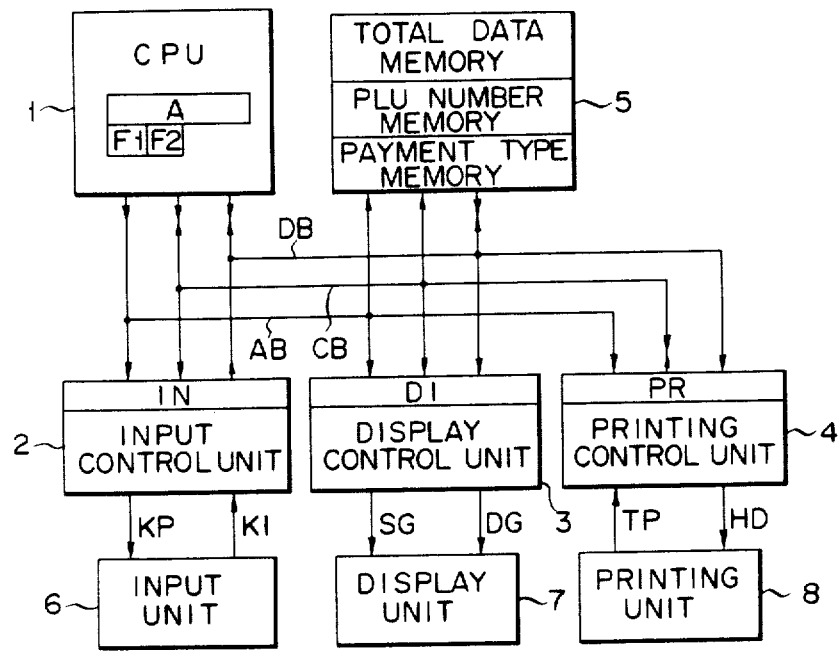
FIG. 1 is a block diagram showing the configuration of an electronic register according to an embodiment of the present invention.

FIG. 1 schematically shows the configuration of the electronic register of the present invention. Referring to FIG. 1, reference numeral 1 denotes a CPU which outputs an R/W signal and a chip designating signal through a control bus CB to an input control unit 2, a display control unit 3, a printing control unit 4 and a memory 5 and to which is input a printing signal representing that printing is in progress from the printing control unit 4. The CPU 1 also outputs an address signal through an address bus AB to the control units 2, 3 and 4 and the memory 5. To the CPU 1 is input through a data bus DB data from an input buffer IN incorporated in the input control unit 2. The CPU 1 outputs data to a display buffer DI incorporated in the display control unit 3 and to a printing buffer PR incorporated in the printing control unit 4. The CPU 1 exchanges data with the memory 5.

The input control unit 2 outputs a timing signal KP to an input unit 6. When the key operation is performed at the input unit 6, the timing signal KP is selected according to the operated key and is input to the input buffer IN as a key input signal KI. The display control unit 3 outputs a digit sgnal DG and a segment signal SG obtained by decoding data in the display buffer DI to a display unit 7 which displays the amount data or the like. The printing control unit 4 receives a print position signal TP of the printing drum (not shown) incorporated at a printing unit 8, and supplies a print drive signal HD obtained upon the coincidence of the print position signal TP and the data in the printing buffer PR to the printing unit 8. The printing unit 8 prints the amount data or the like in response to the print drive signal HD. The memory 5 has a PLU (price look up) memory 5a in each memory location of which is preset by the input unit 6 a PLU number code in correspondence with the item. Prices of the corresponding items are present by a suitable means in the memory locations associated with these memory locations. The data on the number of items sold for each different item is also stored in each memory location associated with the key operated. The memory 5 also has a payment type memory which accumulates the input sales data according to the payment type such as the cash sales or credit sales.

Figure 2:
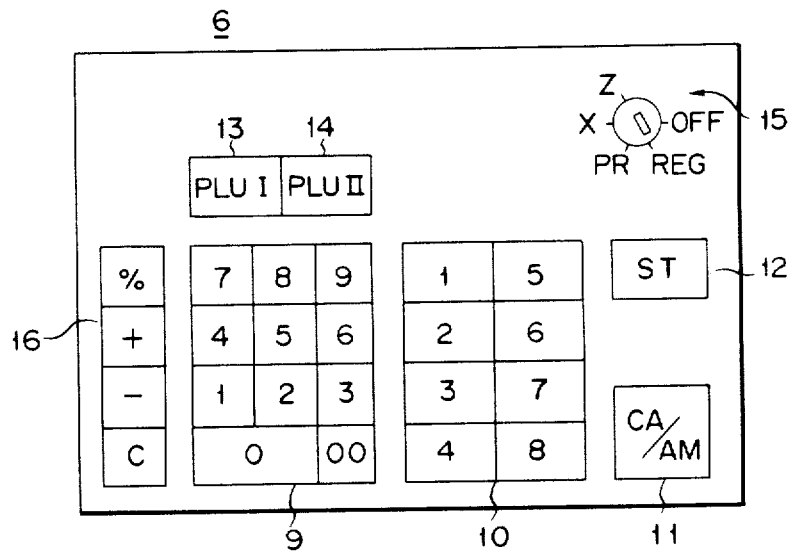
FIG. 2 is a plan view showing an example of an input unit of the present invention.

FIG. 2 shows the control panel of the input unit 6. The input unit 6 has amount keys 9 for registering the amount of money or designating the PLU number codes corresponding to the item involved, department keys 10 for registering the department, a CA/AM key 11, a sub-total key 12, a PLUI key 13 for executing the normal registering after input of the PLU number code upon operation of the amount keys 9, and a PLUII key 14 for executing the single item registering after input of the PLU number code. The input unit 6 further has a mode switch for designating the respective modes of "OFF", "REG(registering)", "PR (setting)", "X (checking)" and "Z (settling)", and has function keys 16.

Figure 3:
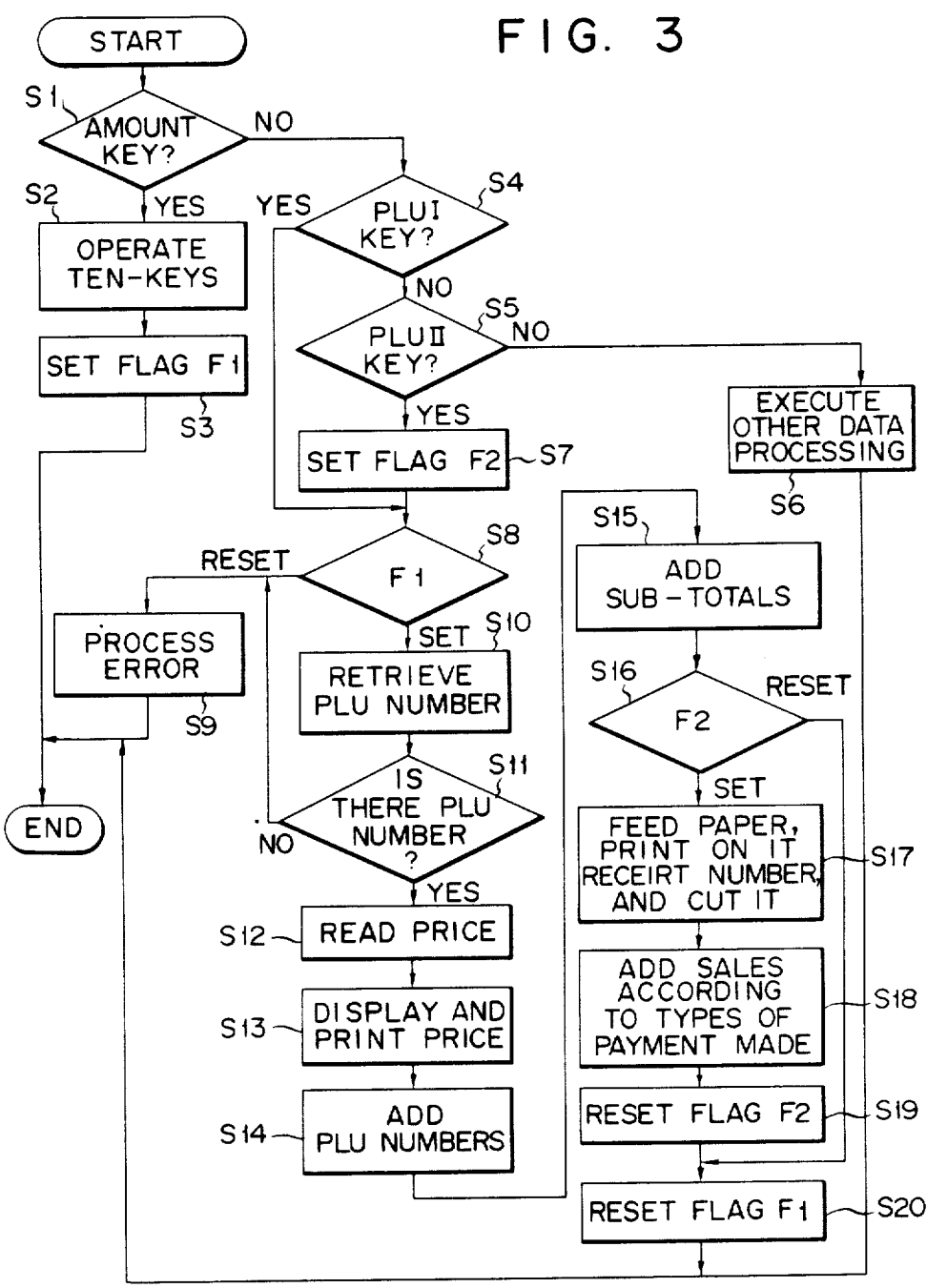
FIG. 3 is a flow chart for explaining the mode of operation of the electronic register according to the present invention.

The mode of operation of the electronic register of the present invention will now be described. A description will first be made on a case wherein the operator performs the single item registering. Assume that the mode switch 15 of the electronic register in a restaurant is set in the "REG" mode and a customer orders one ticket for "katsu-curry". Then, the operator operates the amount keys 9 to enter the corresponding PLU number code, upon which operation is executed according to the flow of operation as shown in FIG. 3.

In step S1, it is discriminated by the CPU 1 if the amount keys 9 are operated for inputting a PLU number code. If the discrimination result is YES, the program advances to step S2. In step S2, registering operation such as storing the registering data, i.e., the PLU number code in the PLU memory 5a of the memory 5 is executed. The program then advances to step S3 wherein a flag representing the operation of the amount keys 9 for registering the PLU number code is set in a flag area F1 of the CPU 1.

After operating the amount keys 9, the operator operates the PLUII key 14 for performing the single item registering. Then, if it is discriminated in step S1 that the operated key is not the amount keys 9 but the PLUII key 14, the program advances to step S4. In step S4, it is discriminated if the operated key is the PLUI key 13. If the discrimination result is NO, the program advances to step S5. In step S5, it is discriminated if the operated key is the PLUII key 14. If the discrimination result is YES, the program advances to step S7. On the other hand, if the discrimination result is NO, the program advances to step S6. If the key other than the PLUII key 14 is discriminated to have been operated, the corresponding processing is executed. During the execution of step S7, a flag representing the operation of the PLUII key 14 is set in a flag area F2 of the CPU 1 and the program then advances to step S8.

Figure 4:
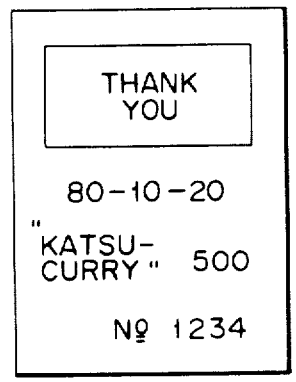
FIG. 4 is a view showing the printed receipt which is issued in the single item registering mode according to the embodiment shown in FIG. 1.

In step S8, it is discriminated if the flag is set in the flag area F1. If the discrimination result is YES, the program advances to step S10. If the discrimination result is NO, it is judged that either the PLUI key 13 or the PLUII key 14 has been operated. Then, the program advances to step S9 and the error processing is performed. In step S10, the PLU number code stored in the PLU memory 5a of the memory 5 is retrieved. In step S11 to follow, it is discriminated if there is a PLU number code input is present. If the discrimination result is NO, the program advances to step S9. If the discrimination result is YES, the program advances to step S12. In step S12, the unit price is read out from the memory location of the PLU memory 5a of the memory 5 storing the input PLU number code and is written in the A register of the CPU 1. In step S13 to follow, the unit price data is transferred to the display buffer DI and is displayed at the display unit 7 through the display control unit 3. At the same time, the unit price data is transferred to the printing buffer PR and is printed together with the item name at the printing unit 8 as shown in FIG. 4. In step S14 to follow, data "1" is added to data on the number of items of the same PLU number code a memory location associated with the memory location of the PLU memory 5a storing the input PLU code number to update the data. The data on the number of items is input every time the PLUII key 14 is operated. In step S15 to follow, the unit price data stored in the A register of the CPU 1 is added to the sub-total of the items up to the immediately preceding addition. If the order for one "katsu-curry" is the first order for this item, the addition of the number of items and addition of the unit price data are not performed.

In step S16 to follow, it is discriminated if a flag representing the operation of the PLUII key 14 is set in a flag area F2 of the CPU 1. If the discrimination result is YES, the program advances to step S17. In step S17, the receipt number is printed on a recording sheet and the recording sheet is fed. After a stamp is sealed for the next receipt sheet, the current receipt sheet is cut and issuance of the current receipt sheet as shown in FIG. 4 is completed. The program then advances to step S18 wherein the unit price of "katsu-curry" is cumulatively stored in a corresponding memory location of the payment type memory of the memory 5. In step S19 to follow, the flag stored in the flag area F2 is reset and the program advances to step S20. If it is discriminated that the flag is not set in the flag area F2 in step S16, steps S17 to S19 are skipped and the program jumps to step S20. In step S20, the content of the flag area F1 is reset, which has been set according to the PLU number code input by the operation of the amount keys 9 prior to the operation of the PLUII key 14.

Figure 5:
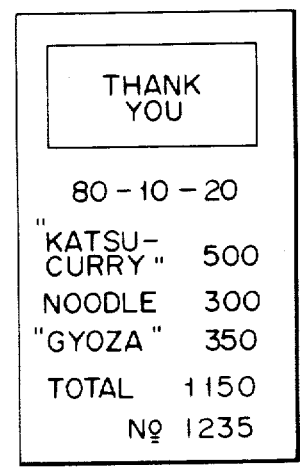
FIG. 5 is a view showing the printed receipt which is issued in the normal registering mode for printing a plurality of items on a single receipt sheet according to another embodiment of the present invention.

The normal registering operation by the operator will now be described below. Assume that a customer orders "noodle", "gyoza" and "katsu-curry" at the same time, and the operator operates the amount keys 9 to input the PLU number code corresponding to "katsu-curry" and operates the PLUI key 13. Then, steps S1 to S4, S8, S10 to S16 and S20 are sequentially executed. As a result, the name of the item and the unit price are printed on the recording sheet as shown in FIG. 5. However, since steps S17, S18 and S19 are not executed, the receipt is not issued. Similarly, if the operator operates the amount keys 9 for inputting the PLU number code corresponding to "noodle", the PLUI key 13, the amount keys 9 for inputting the PLU number code corresponding to "gyoza", and the PLUI key 13 in the order named, the respective steps as described above are executed and the names of the items and the corresponding unit prices are sequentially printed on the recording sheet. When the CA/AM key 1 as the payment type key is operated, the total sum of the respective unit prices for this customer is printed on the recording sheet, and the receipt is issued as shown in FIG. 5 to complete the normal registering.

In this manner, the operator performs the single item registering for each order of the customer; the operator operates the PLUII key 14 for issuing the receipt after the registering of a single item and operates the PLUI 13 for performing the normal registering of a plurality of items.

In the embodiment described above, the PLU number codes corresponding to "katsu-curry", "noodle", and "gyoza" are input by operating the amount keys 9, the PLUI key 13 is operated to perform operation of data, and the CA/AM key 11 as the payment type key is operated to issue the receipt. However, it is also possible to print "katsu-curry" and "noodle" by operating the PLUI key 13 in the normal registering mode and to print "gyoza" subsequently by operating the PLUII key 14. In this manner, the operation of the CA/AM key 11 as the payment type key may be omitted for issuing the receipt.

In the embodiment described above, the PLUI key 13 was the first selection key and the PLUII key 14 was the second selection key. However, the present invention is not limited to this. For example, the first selection key may be an item number key I and the second selection key may be an item number key II. In this case, the PLU number code is input by operating the key I and the key II is then operated. Subsequently, the price data is input by operating the ten keys and the corresponding amount keys are operated to complete issuance of the receipt. What is claimed is:

1. An electronic cash register comprising:
inputting means including: numeral keys for inputting code data corresponding to goods being sold; at least one payment type key for designating at least one of different payment types; a first price look-up key for initiating an addition of a number of sold goods of a given type corresponding to said code data; and a second price look-up key for initiating an addition of the number of sold goods corresponding to said code data and an addition of a price of sold goods for one of said different payment types;

memory means including: a price look-up memory having a plurality of respective storing areas for storing unit prices of goods corresponding to said code data inputted by said numeral keys and for storing a total number of sold goods; and a payment type memory having storing area for storing a total amount of sales for one of said different payment types;

arithmetic means coupled to said inputting means and to said memory means, for adding "+1" to said total number of sold goods corresponding to said code data in response to the operation of said first price look-up key, and for adding "+1" to said total number of sold goods and for adding a unit price of said sold goods, which corresponds to said code data and is read from said price look-up memory, to said total amount of sales in response to the operation of said second price look-up key; and receipt issuing means coupled to said arithmetic means for issuing a receipt having said price printed thereon, after said arithmetic means performs the addition for obtaining the total number of sold goods and the addition for obtaining the total amount of sales in response to the operation of said second price look-up key.

2. The electronic cash register of claim 1, wherein:
said payment type key indicates the start of the addition of sales for one of said different payment types; and said receipt issuing means includes means for issuing said receipt with said price printed thereon after said arithmetic means performs the addition for obtaining the total number of sold goods in response to the operation of said first price look-up key and performs the addition of the total amount of sales in response to operation of said payment type key.

* * * * *